United States Patent

Orain

[11] Patent Number: 4,472,156
[45] Date of Patent: Sep. 18, 1984

[54] AXIALLY RETAINED TRIPOD JOINT

[75] Inventor: Michel A. Orain, Conflans Sainte Honorine, France

[73] Assignee: Glaenzer Spicer, Poissy, France

[21] Appl. No.: 378,000

[22] Filed: May 13, 1982

[30] Foreign Application Priority Data

Jun. 1, 1981 [FR] France .............................. 81 10797

[51] Int. Cl.³ ............................................. F16D 3/24
[52] U.S. Cl. .................................... 464/111; 464/132; 464/905
[58] Field of Search ............... 464/111, 120, 122, 123, 464/124, 132, 905; 308/215

[56] References Cited

U.S. PATENT DOCUMENTS

| 1,910,184 | 5/1933 | Scribner | 308/215 X |
| 3,757,534 | 9/1973 | Orain | 464/123 X |
| 4,192,154 | 3/1980 | Nakamura et al. | 464/111 |

FOREIGN PATENT DOCUMENTS

| 0132046 | 10/1979 | Japan | 464/111 |
| 0036614 | 3/1980 | Japan | 464/124 |
| 0054721 | 4/1980 | Japan | 464/111 |

Primary Examiner—Stuart S. Levy
Assistant Examiner—Daniel P. Stodola
Attorney, Agent, or Firm—Wenderoth, Lind & Ponack

[57] ABSTRACT

A homokinetic joint includes rollers mounted to swivel on the spherical ends of arms of a tripod element by means of free diabolo-shaped rolling elements. Three pairs of runways are provided in a bowl element for the rollers. These runways are curved in planes parallel to an axial plane of the bowl element. Two floating rings maintain the mean planes of the rollers parallel to one another. The tripod element is in this way axially retained in the bowl element by the retention of the rollers in the runways axially of the bowl element by a combined effect of the curved shape of the runways and the maintenance of the mean planes of the rollers parallel to one another, with no need for other devices. This joint is compact, highly efficient, and has a high torque-transmitting capacity and a large break angle.

18 Claims, 10 Drawing Figures

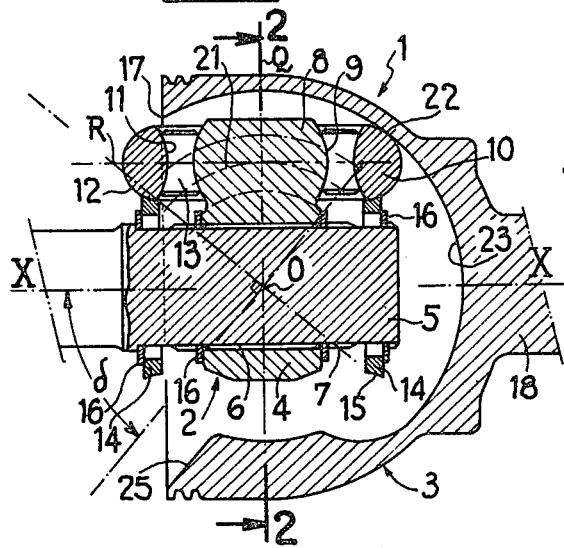
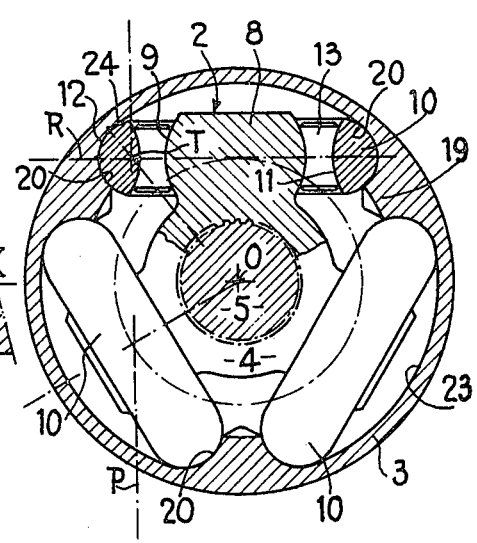
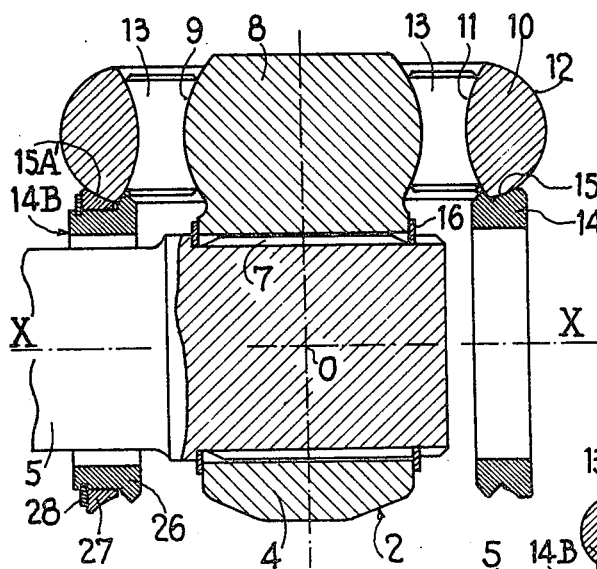
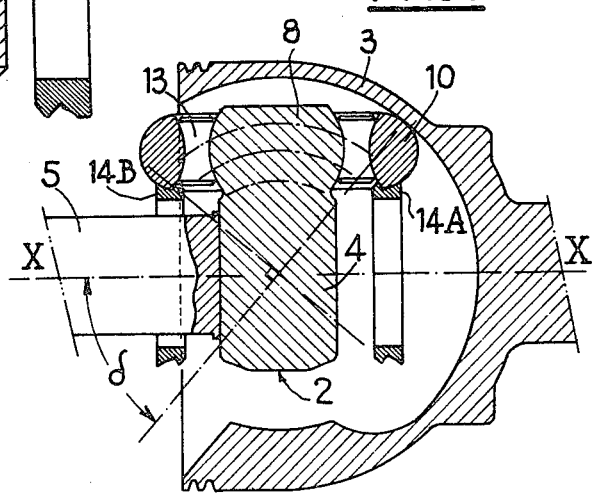

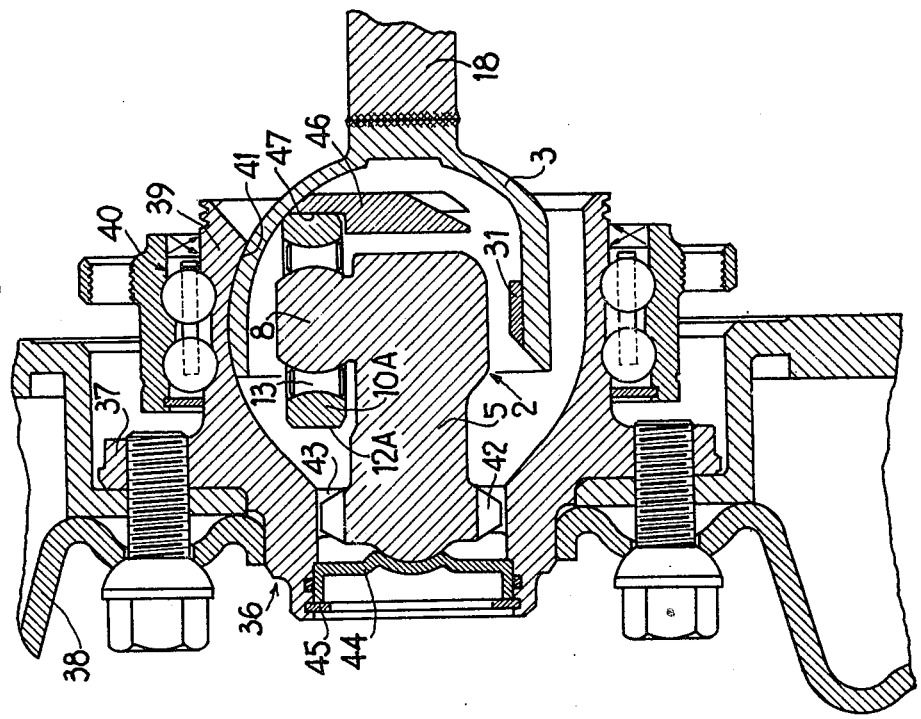
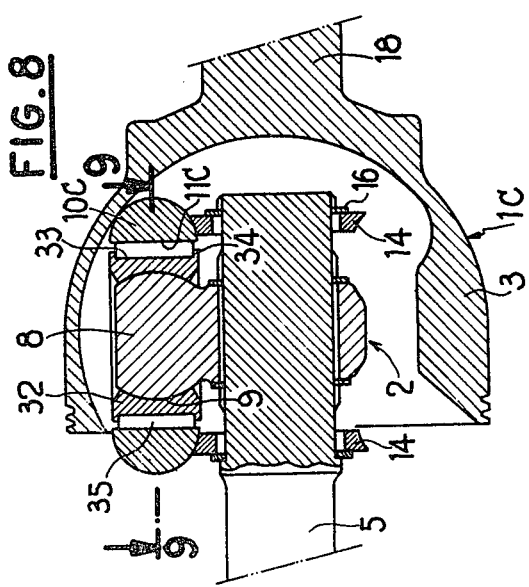
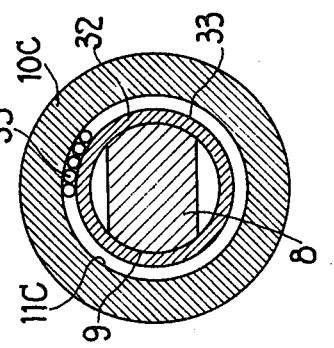

AXIALLY RETAINED TRIPOD JOINT

DESCRIPTION

BACKGROUND OF THE INVENTION

The present invention relates to homokinetic tripod joints of the type in which a tripod element is axially retained in a bowl element provided with runaways whose line through the centres is curved.

These joints are usually employed for driving the driving wheels of front wheel drive automobiles. They must be capable of transmitting the driving torque at large operating angles and must be sufficiently strong to avoid fracture as a result of a driving fault (sudden engagement of the clutch) when the wheels are at a steering angle, ie. in the configuration in which their mechanism is subjected to maximum stresses.

When it is desired to increase the angular possibilities of these joints, one is led to very substantially increase their dimensions if it is desired to retain the same strength at the maximum angle of operation and the same joint life. This required increase in dimensions increases more rapidly than the possible angularity so that there results, with respect to angles of the order of 50°, either an unacceptable overall size or insufficient strength and joint life. Further, in conventional joints of this type, a part of the internal volume of the bowl element is occupied by means for maintaining the tripod element pre-stressed against the inner end of the bowl element, which renders these difficulties more serious and increases the complexity of the joint.

SUMMARY OF THE INVENTION

An object of the invention is to provide a very compact and reliable homokinetic joint which is capable of operating up to an operating angle of about 50° with a high torque capacity and in which the tripod element positions itself inside the bowl element.

The invention consequently provides a tripod joint of the aforementioned type, wherein each roller is mounted to rotate, slide and swivel on a spherical surface of the corresponding arm of the tripod element and means are provided for maintaining the mean planes of the three rollers parallel to a single direction.

Further, in conventional joints of the aforementioned type, with an increase in the angularity there also arise problems of heating of the mechanism. The mechanical losses, which are of the order of 5% to 10%, according to the considered type of joint for an angle of 40°, increase in accordance with a substantially parabolic law as a function of the operating angle and may result in a rapid seizure subsequent to the destruction of the lubricant resulting from an excessively high temperature.

In an advantageous embodiment of the invention, these mechanical losses are considerably reduced by the fact that each roller is mounted on its arm by means of a ring arrangement of free diabolo-shaped rollers interposed between the spherical surface of the arm and a convex inner toric surface of the roller.

BRIEF DESCRIPTION OF THE DRAWINGS

The invention will be described in more detail with reference to the accompanying drawings which show only some embodiments of the invention and wherein:

FIG. 1 is an axial sectional view of a tripod joint according to the invention;

FIG. 2 is a sectional view taken on line 2—2 of FIG. 1;

FIG. 3 is a partial axial sectional view of a modification of the joint of FIG. 1;

FIGS. 4 to 6 are axial sectional views of other modifications of the joint of FIG. 1;

FIG. 8 is an axial sectional view of another embodiment of the tripod joint according to the invention;

FIG. 9 is a sectional view taken on line 9—9 of FIG. 8; and

FIG. 10 is an axial sectional view of another embodiment of the tripod joint according to the invention in the application thereof to the driving of a front wheel hub of an automobile vehicle.

DETAILED DESCRIPTION OF THE INVENTION

Figure 5:
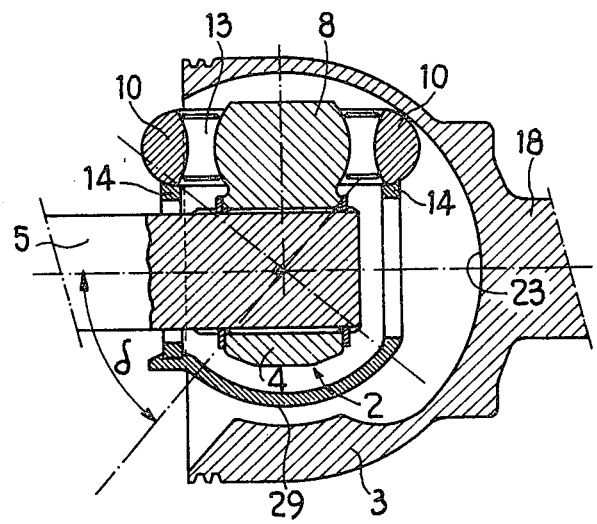

Hereinafter, the tripod joints will be described in their perfectly aligned positions as illustrated in the drawings. The joints then have a tertiary symmetry about their axis X—X.

The joint 1 shown in FIGS. 1 and 2 mainly comprises a male or tripod element 2 received in a female or bowl element 3.

The tripod element 2 comprises a centre hub 4 fitted on a shaft 5 and keyed to the latter, at a short distance from its end, by splines 6 and circlips 7. Three arms or trunnions 8 having a convex spherical surface 9 extend radially outwardly from this hub at 120° to each other.

Each arm 8 carries an annular roller 10 whose inner surface 11 and outer surface 12 are convex and toric. Interposed between the surfaces 9 and 11 is a ring arrangement of free diabolo-shaped rolling elements 13, optionally with the interposition of spacing means (not shown). The generatrix of these rolling elements is an arc of a circle whose radius is substantially equal to the radius of the surfaces 9 and 11. The radius of the surface 12 is distinctly smaller. The length of the rolling elements 13 is a little less than the thickness of the rollers 10.

Mounted on the shaft 5 with clearance are two thin rings 14 which are located on each side of the tripod element. Each of the rings has a cylindrical bore and a roughly spherical peripheral surface 15 which faces the other ring. The surfaces 15 are maintained in contact with the radially exterior edge, constituted by the inner portion of the surface 12, of the three rollers 10 by means of two circlips 16 which are carried by the shaft 5 and are disposed on each side of the two rings. The latter are thus radially freely movable on the shaft 5.

The bowl element 3 has the general shape of a thin-walled spherical dome which is larger than a semisphere and defined by a planar surface which defines an entrance opening 17. Opposite the latter, the bowl element is rigid with a second shaft 18 which is connected to the shaft 5 by the joint 1.

The inner spherical surface 23 of the bowl element 3 is provided with three ribs 19 (FIG. 2) defining three cavities for the rollers 10. Each cavity is laterally bordered by two confronting runways 20.

Each runway 20 has a concave toric shape, its cross-sectional shape is constant and is an arc of a circle whose radius is very slightly larger than the radius of the surface 12 of the rollers 10, its line 21 through the centres is also circular and is contained in a plane P parallel to the axis of the shaft 18 and centered on the diameter of the bowl element perpendicular to this plane P. The line 21 extends angularly about 90° from the entrance 17 of the bowl element symmetrically relative to the transverse diametral plane Q of the bowl element.

When the joint is in alignment, the plane Q is also an axial plane of the rollers 10. The mean planes R of the latter are maintained parallel to the axis X—X by the rings 14. The rollers 10 are tangentially in contact by their surface 12 with the section of the runways 20 contained in the plane P and with a point 22 of the inner spherical surface 23 of the bowl element.

If a pull is exerted on the shaft 5, the rollers 10 abut against the outer edge portion of their runways 20 and are held in position by the rings 14. This abutment and, in the opposite direction, the contacts 22 of the rollers 10 with the spherical surface 23, axially positions the tripod element in the bowl element with no necessity for any additional means. It is even possible to dispense with the contacts 22, which are rather difficult to achieve, provided that, as illustrated, the torus 12 and torus 20 are tangent to each other and to the spherical surface 23 at the same point 24 (FIG. 2). This condition is satisfied when, in the plane of FIG. 2, the centre O of the joint, the centre T of the runway and the point 24 are in alignment. The rollers 10 would then have to be slightly smaller.

Each roller 10 is mounted on its corresponding arm by inserting the last roller of the rolling elements 13 at an angle and then axially urging the roller 10 toward the hub 4. The circumferential clearance between the large diameter ends of adjacent rolling elements 13 is nonetheless sufficiently small so that, when the roller 10 moves axially outwardly, these ends all come into mutual contact before the roller 10 comes away from its arm 8. These arrangements are described in detail in French patent application No. 81 10 799 entitled "Homokinetic tripod joint having swivelling rollers".

When the joint rotates at an angle, the rollers 10 roll in their runways 20 while moving along the arms 8 of the tripod element. The rolling elements 13 then effect combined movements of sliding and rolling which very effectively eliminate the internal friction in the joint. Indeed, it is found that the efficiency is very high irrespective of the joint break angle. The axes of the rolling elements 13 remain parallel to those of the rollers 10 owing to the fact that they roll along toric surfaces 11. During their movements, the rollers 10 slightly swivel on the arms 8 and on the surfaces 15 of the rings 14 and their three mean planes R are maintained by the rings 14 substantially parallel to a single direction.

The maximum break angle δ of the joint is defined by the contact of the shaft 5 with chamfers 25 provided at the entrance of the bowl element. It may be as much as 50°. The joint 1 is then a joint operating by a practically pure rolling motion and consequently at a very high efficiency with a very large break angle and has for a small overall size a specific capacity (or torque capacity relative to the cube of the outside diameter) which is much greater than that of known joints. The latter advantage results in particular from the large dimension of the three rollers 10 inscribed within the bowl element 3 (FIG. 2).

By way of a modification, the rings 14 could also be tangent to the radially inner edge of the rollers 10, on the inner surface 11. In this case, the circlips 16 would be placed against the inner surface of the rings 14 or replaced by a radially floating spacer member around the shaft and the body of the tripod element 2 and maintaining the two rings spaced apart from each other and in tangential contact with the three rollers 10.

In the modification shown in FIG. 3, the rings 14A, 14B have outer surfaces 15A, 15A', respectively, each in the shape of a V tangent to both the surfaces 11 and 12 of the three rollers 10. In this case, the two rings axially position themselves with no need for circlips or a spacer member. The ring 14B located adjacent to the opening 17 of the bowl element may be made in two parts 26 and 27, the part 27 being placed in position last of all and being retained on the part 26 by means of a circlip 28. It may also (FIG. 4) be constituted by a single member and be placed in position by a clipping arrangement under the effect of an axial thrust exerted by a press which radially elastically deforms it at the moment of straddling of the edge of the third roller 10 in the mounting order.

In another modification of the joint (FIG. 5), the two rings 14 are only tangent to the surfaces 12 of the rollers 10 and the inner ring 14 is provided with three flexible roughly axial arms 29 in one piece with the ring, the end portions of these arms being clipped on the other ring 14 between the rollers 10.

In the modifications shown in FIGS. 3 to 5, there is no necessity for the shaft 5 to extend through the hub 4 of the tripod element. As illustrated in FIG. 4, the tripod element may consequently be solid and fixed to the end of the shaft 5, eg. by friction welding, which is an inexpensive solution.

Figure 6:
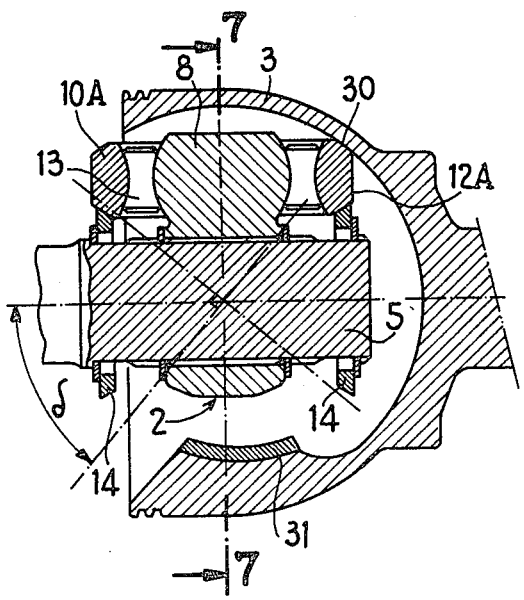
Figure 7:
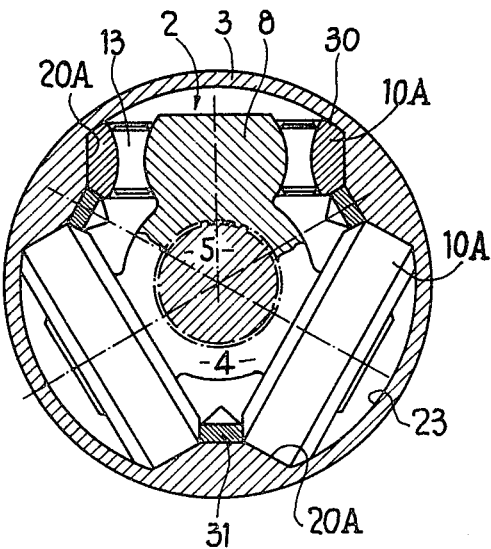
FIG. 7 is a sectional view taken on line 7—7 of FIG. 6.

The embodiment shown in FIGS. 6 and 7 differs from that shown in FIGS. 1 and 2 only in the shape of the outer surface 12A of the rollers 10. The latter are externally cylindrical with a roughly conical or spherical chamfer 30 at each end. The shape of the runways 20A is consequently modified, preferably by satisfying the condition of the double tangency 30-20A-23 indicated with respect to the embodiment shown in FIG. 1. The runways 20A are consequently essentially planar. The apex of the ribs 19 is replaced by three curved tongue members 31 which are fixed in the bowl element and cooperate with the inner chamfers 30 of the three rollers 10.

Note that the axial retention of the tripod element by the simple contact of the rollers 10 on the inner surface of the bowl element 3 is only possible in fact because the rollers 10 are movable both in orientation and axially relative to the trunnions 8 of the tripod element and owing to, the properties of the diabolo-shaped rolling elements 13, but this cannot be envisaged in conventional tripod joints whose rollers are rigidly oriented by the trunnions of the tripod element.

Consequently, the diabolo-shaped rolling elements 13 could be replaced in a modification by the combination of three connections of known type each of which provides the rollers a degree of freedom, namely a freedom of axial sliding, a freedom of swivelling and a freedom of rotation of the roller on the trunnion.

FIGS. 8 and 9 show a joint 1C satisfying these conditions. An internally spherical ring 32 swivels on each arm 8. Its outer surface 33 is cylindrical and is provided with two end ledges 34, and the inner surface 11C of the rollers 10C is cylindrical. A ring arrangement of needles 35 is interposed between the surfaces 33 and 11C. However, in this joint, the amount of friction is higher, the component parts are weaker and the product is more expensive.

FIG. 10 shows another embodiment of the joint according to the invention applied to the driving of a front wheel hub. The invention is on the whole such as that described in French patent application No. 81 02 465. There is provided a hub 36 which defines a wheel-carrying flange 37 on which a wheel 38 is fixed, an inner ring 39 of a rolling bearing 40 having two rows of balls, and a concave spherical surface 41. Shaft section 5 has one end portion which forms the hub and the arms of the tripod element 2 and another end portion which carries splines 42 engaged in splines 43 of the hub. The thrust or abutment members of the tripod element include an assembly comprising plate 44 and circlip 45 on one side and member 46 on the other side, the member 46 bearing against the rollers 10A by a radial surface 47 and against the inner spherical surface 23 of the bowl element 3 which swivels in the sphere 41 after assembly with the latter of the bayonet type.

However, the tripod element 2, the rollers 10A and the runways are the same as in FIGS. 6 and 7 and the tongue members 31 are still employed for completing the runways. Note that the rings 14 are unnecessary owing to the fact that the tripod element is axially retained in the bowl element by the swivelling of the latter in the sphere 41 and by the abutments 44, 45 and 46. Further, the shape of the runways permits eliminating any undercut in the bowl element 3, providing the shape of the tongue members 31 is slightly modified. The bowl element can be manufactured inexpensively by a cold forming operation.

In each embodiment, although this has not been represented, there is provided a bellows or gaiter for protecting the mechanism and retaining the lubricant. Moreover, the axis of the line 21 through the centres of each runway may be slightly offset relative to the corresponding diameter of the bowl element either axially as shown in FIG. 10, or radially, or axially and radially instead of passing through the centre O of the joint as in FIGS. 1 to 9.

The invention is also applicable to fixed tripod joints in which the arms of the tripod element are convergent and not divergent and extend radially through the bowl element provided with runways. However, the important advantage of a small radial overall size of the joint is then lost.

Having now described my invention what I claim as new and desire to secure by Letters Patent is:

1. A homokinetic tripod joint comprising:
   a bowl element having an axis of rotation, said bowl element defining an inner spherical surface and three pairs of runways, the runways of each said pair of runways extending in a curved substantially arcuate path in a plane parallel to a respective axial plane of said bowl element, said curved paths of said three pairs of runways being convergent in a direction axially outwardly of said bowl element;
   a tripod element having an axis of rotation and three arms, each said arm having an axis extending radially from said axis of said tripod element and defining a spherical surface centered on said axis of said arm;
   three annular rollers, each said roller having an axis of rotation, a mean plane perpendicular to said axis of said roller and annular edge portions, and each said roller being in rolling engagement with a respective said pair of runways;
   first means mounting each said roller on a respective one of said spherical surfaces so that said roller is capable of rotating and swivelling relative to said respective spherical surface;
   second means axially retaining said tripod element in said bowl element, said second means comprising outer edge portions of said runways of each said pair of runways, and each said roller having an outer surface in tangential contact with sections of said runways of said respective pair of runways contained in said respective parallel plane and with a point on said inner spherical surface of said bowl element, such that said rollers and thereby said tripod element are positioned axially in said bowl element by engagement of said rollers at said points and against said outer edge portions of said runways; and
   third means for maintaining said mean planes of said three rollers parallel to a single direction, said third means comprising two rings mounted in floating relation to said axes of said tripod and bowl elements, each said ring being tangent to and engaged with at least one of said annular edge portions of said three rollers.

2. A tripod joint according to claim 1, wherein said bowl element has between the runways of each said pair of runways said spherical inner surface, and each said roller is tangent to said runways of the respective said pair of runways and to said spherical inner surface of said bowl element at a single point.

3. A tripod joint according to claim 2, wherein said rollers are in abutting relation solely to said edge portions of said runways of the respective pairs of runways.

4. A tripod joint according to claim 1, wherein the rollers have a toric outer shape rollable along the runways which have a conjugate sectional shape.

5. A tripod joint according to claim 1, wherein the rollers have a cylindrical and chamfered outer surface.

6. A tripod joint according to claim 1, wherein a radially inner portion of each runway is defined by an added member mounted on the bowl element.

7. A tripod joint according to claim 1, wherein said first means comprise an inner convex toric surface of each said roller and a ring arrangement of free diabolo-shaped rolling elements interposed between the respective said spherical surface and said inner convex toric surface of the respective said roller.

8. A tripod joint according to claim 7, wherein said bowl element has between the runways of each said pair of runways said spherical inner surface, and each said roller is tangent to said runways of the respective said pair of runways and to said spherical inner surface of said bowl element at a single point.

9. A tripod joint according to claim 8, wherein said rollers are in abutting relation solely to said edge portions of said runways of the respective pairs of runways.

10. A tripod joint according to claim 7, wherein said rollers have a toric outer shape rollable along said runways which have a conjugate sectional shape.

11. A tripod joint according to claim 7, wherein said rollers have a cylindrical and chamfered outer surface.

12. A tripod joint according to claim 7, wherein a radially inner portion of each said runway is defined by an added member mounted on said bowl element.

13. A tripod joint according to claim 1, wherein each said roller has an outer surface which is convex in cross-section and cooperative with the runways of the respective said pair of runways which are concave in cross-section.

14. A tripod joint according to claim 13, wherein said bowl element has between the runways of each said pair of runways said spherical inner surface, and each said roller is tangent to said runways of the respective said pair of runways and to said spherical inner surface of said bowl element at a single point.

15. A tripod joint according to claim 14, wherein said rollers are in abutting relation solely to said edge portions of said runways of the respective pairs of runways.

16. A tripod joint according to claim 13, wherein said rollers have a toric outer shape rollable along said runways which have a conjugate sectional shape.

17. A tripod joint according to claim 13, wherein said rollers have a cylindrical and chamfered outer surface.

18. A tripod joint according to claim 13, wherein a radially inner portion of said runway is defined by an added member mounted on said bowl element.

* * * * *